US012384991B2

(12) United States Patent
Beveridge et al.

(10) Patent No.: US 12,384,991 B2
(45) Date of Patent: Aug. 12, 2025

(54) DYE-CAPTURING NON-WOVEN FABRIC AND METHOD FOR PRODUCING THE SAME

(71) Applicant: Glatfelter Gernsbach GmbH, Gernsbach (DE)

(72) Inventors: Colin Beveridge, Northumberland (GB); Armin Bauer, Gernsbach (DE); Máté Nagy, Baden-Baden (DE)

(73) Assignee: Glatfelter Gernsbach GmbH, Gernsbach (DE)

( * ) Notice: Subject to any disclaimer, the term of this patent is extended or adjusted under 35 U.S.C. 154(b) by 559 days.

(21) Appl. No.: 17/616,163

(22) PCT Filed: May 19, 2020

(86) PCT No.: PCT/EP2020/063964

§ 371 (c)(1),
(2) Date: Dec. 2, 2021

(87) PCT Pub. No.: WO2020/244925

PCT Pub. Date: Dec. 10, 2020

(65) Prior Publication Data

US 2022/0243152 A1 Aug. 4, 2022

(30) Foreign Application Priority Data

Jun. 5, 2019 (EP) .................................... 19178414

(51) Int. Cl.

*C11D 17/04* (2006.01)
*C11D 3/00* (2006.01)
*D06M 15/267* (2006.01)

(52) U.S. Cl.

CPC .......... *C11D 17/041* (2013.01); *C11D 3/0021* (2013.01)

(58) Field of Classification Search

None

See application file for complete search history.

(56) References Cited

U.S. PATENT DOCUMENTS 3,905,864 A 9/1975 Curry et al.
5,672,415 A 9/1997 Sawyer et al.
(Continued)

FOREIGN PATENT DOCUMENTS

EP 1 170 356 A1 1/2002
EP 2 009 175 B1 5/2012
(Continued)

OTHER PUBLICATIONS

C. P Smith, Jr., "A Review of Methods for Coloring Nonwovens, Textile Chemist & Colorist." Feb. 90, vol. 22, Issue 2, pp. 25-29, (Abstract).

(Continued)

*Primary Examiner* — Lorna M Douyon
(74) *Attorney, Agent, or Firm* — Blank Rome LLP

(57) ABSTRACT

The present invention relates to a method for producing a dye-capturing non-woven fabric, the method comprising the steps of providing a non-woven substrate and applying a composition to the non-woven substrate, the composition having binding and dye-capturing functionalities. The present invention further relates to a dye-capturing non-woven fabric obtainable by such a method and a dye-capturing non-woven fabric comprising a non-woven substrate comprising cellulose fibers and a dye-capturing agent adhering to the non-woven substrate by means of a binder and/or a dye-capturing agent being absorbed in the non-woven substrate.

9 Claims, 3 Drawing Sheets

Proposed cured binder structure around the nonwoven fiber structure of cationic charge-stabilized (Imidazole-Epichlorohydrin)-adduct (R1) and the Polyamido-amine epichlorohydrin (R2), activated/connected with Citric acid

(56) References Cited

U.S. PATENT DOCUMENTS

| | | | | |
|---|---|---|---|---|
| 5,993,714 | A | 11/1999 | Sawyer et al. | |
| 2003/0158075 | A1* | 8/2003 | Panandiker | C11D 3/3776 510/475 |
| 2004/0129632 | A1 | 7/2004 | Le Brech et al. | |
| 2007/0105744 | A1* | 5/2007 | Amiconi | C11D 17/042 510/315 |
| 2009/0069210 | A1 | 3/2009 | Penninger et al. | |
| 2009/0137170 | A1* | 5/2009 | Luoni | D06P 1/5257 8/115.6 |
| 2014/0072767 | A1 | 3/2014 | Klaska et al. | |
| 2016/0186097 | A1* | 6/2016 | Fantini | C11D 17/046 427/430.1 |
| 2017/0114305 | A1 | 4/2017 | Spill et al. | |

FOREIGN PATENT DOCUMENTS

| | | | |
|---|---|---|---|
| EP | 2 835 419 | A1 | 2/2015 |
| EP | 3 034 594 | A1 | 6/2016 |
| EP | 3 572 495 | A1 | 11/2019 |
| EP | 3 572 496 | A1 | 11/2019 |
| RU | 2142528 | C1 | 12/1992 |
| RU | 2587790 | C2 | 6/2016 |
| WO | WO 97/48789 | | 12/1997 |
| WO | WO 00/71652 | A2 | 11/2000 |
| WO | WO 2007/088149 | A1 | 9/2007 |
| WO | WO 2009/062865 | A2 | 5/2009 |
| WO | WO 2009/062865 | A3 | 5/2009 |
| WO | WO 2012/078950 | A1 | 6/2012 |
| WO | WO 2012/107405 | A1 | 8/2012 |
| WO | WO 2016/096715 | A1 | 6/2016 |
| WO | WO 2018/083170 | A1 | 5/2018 |

OTHER PUBLICATIONS

Youjisuan, Fajiao, et al. "Fermentation Organic Acids Production and Application Manual." China Light Industry Press. Sep. 2000. http://www.chlip.com.en (10 pages).

* cited by examiner

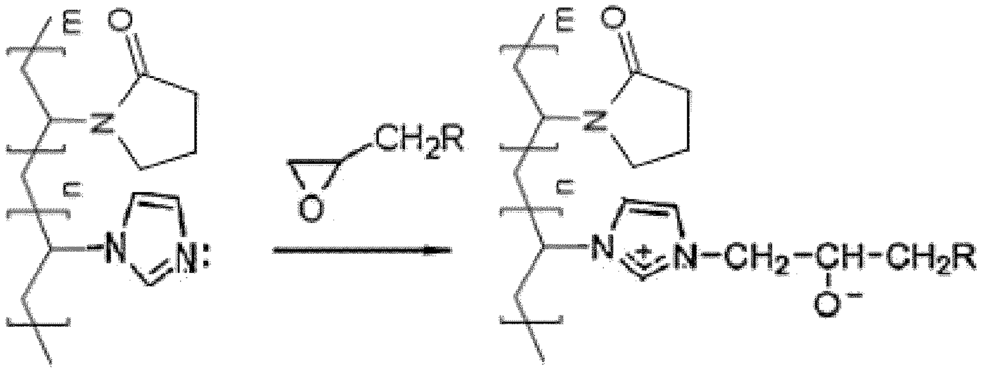
Figure 1. Stabilized cationic charge on a branched quaternary amine moiety.
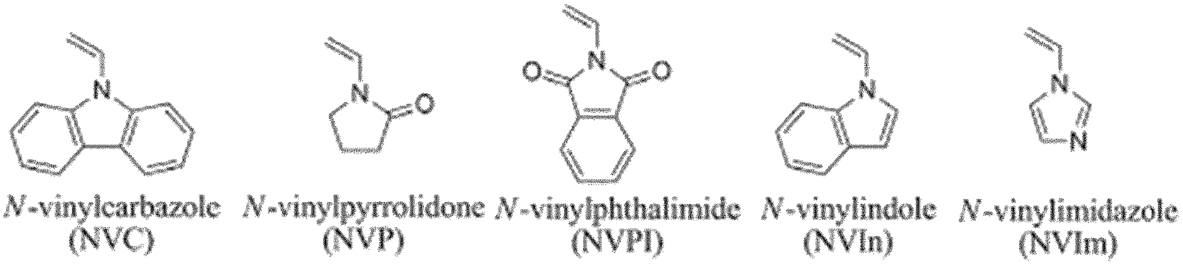
Figure 2. Examples of other co-polymer building blocks used with Imidazole.
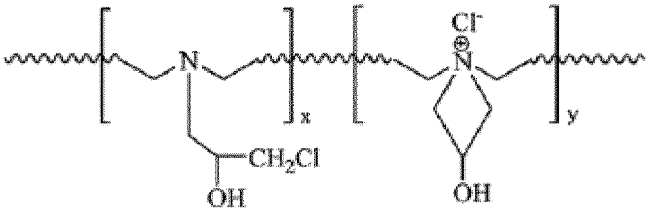
Figure 3/a. Polyamido-amine epichlorohydrin polymer structure

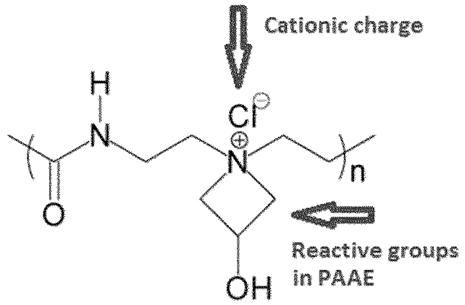
Figure 3/b. Stabilized cationic quaternary amine and the reactive group on the PAAE polymer
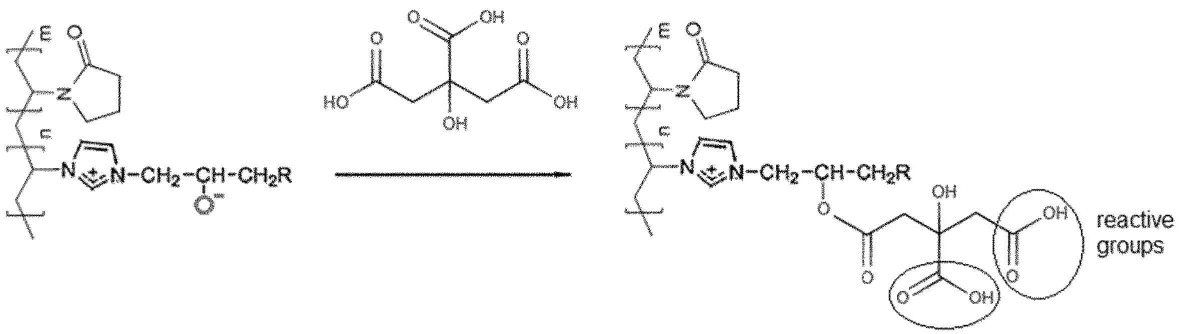
Figure 4. (Imidazole-Epichlorohydrin)-adduct activation with Citric acid
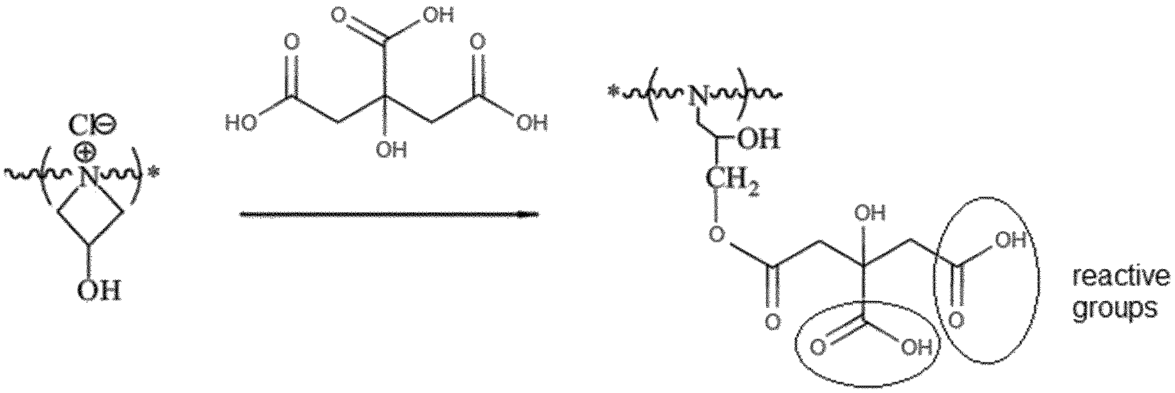
Figure 5. Polyamido-amine epichlorohydrin activation with Citric acid

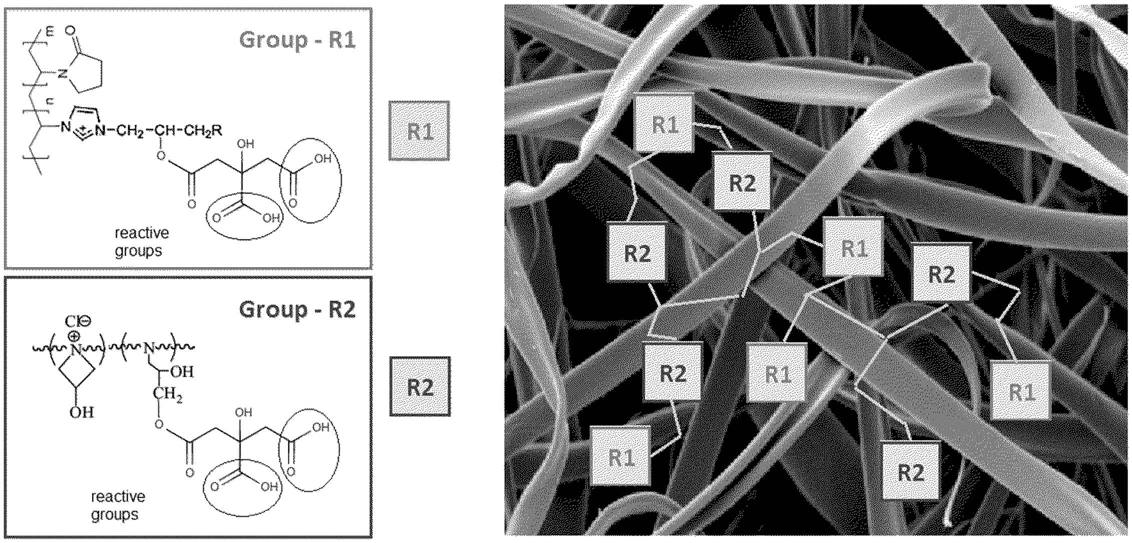
Figure 6. Proposed cured binder structure around the nonwoven fiber structure of cationic charge-stabilized (Imidazole-Epichlorohydrin)-adduct (R1) and the Polyamido-amine epichlorohydrin (R2), activated/connected with Citric acid

DYE-CAPTURING NON-WOVEN FABRIC AND METHOD FOR PRODUCING THE SAME

CROSS REFERENCE TO RELATED APPLICATIONS

The present application is a U.S. national phase of International Application No. PCT/EP2020/063964 filed 19 May 2020 which designated the U.S. and claims priority to European Patent Application No. 19 178 414.9 filed 5 Jun. 2019, the entire contents of each of which are hereby incorporated herein by reference.

FIELD OF THE INVENTION

The present invention relates to methods for producing a dye-capturing non-woven fabric, such as a color catcher laundry sheet, and to dye-capturing non-woven fabrics. In particular, the dye-capturing non-woven fabric may be capable for capturing dye from a washing liquor, while clothes are laundered, and may be capable of preventing a redeposition of any released dye on the clothes.

BACKGROUND

Color catcher laundry sheets may be placed into a washing machine together with laundry during washing in order to prevent color from being transferred from one piece of laundry to another during the washing process. A color catcher laundry sheet typically consists of a base sheet and a special color catching substance that is chemically bonded onto the base sheet. The base sheet is usually composed of fibers and a binder. The fibers can be of various kinds (such as synthetic, natural and/or regenerated cellulose), but at least one kind of fiber contains OH groups, for instance cellulose fibers. The base sheet can be manufactured by a wet-laid, air-laid or spunlace process.

Conventionally, color capture functionalization has been achieved through the cationisation of a non-woven substrate at high pH (for instance more than 10). Known techniques utilize for example sodium hydroxide, quartery ammonium compounds such as glycidetrimethylammonium chloride (GMAC), 2-diethylaminoethyl chloride (DEC) and polyvinylamine. In case of GMAC chemistry and the like, a high pH environment (such as an alkaline pH) is required for forming a covalent bond with the hydroxy groups of cellulose. With regard to such secondary chemistry treatment, health and safety concerns have been raised around the handling and processing of such compounds in combination with the presence and release of potential carcinogens. Furthermore, duration of the GMAC grafting is typically between 24 and 36 hours. After the grafting, neutralization with HCl+washing+drying is required, as disclosed in WO 97/48789. Further conventional color catcher laundry sheets wherein a color catching substance is covalently bonded to a base sheet are disclosed in WO 2018/083170 A1 and WO 2016/096715 A1.

With regards to the application in the washing machine, an important requirement is that the color catching substance plus the captured dye remains on the base sheet and does not bleed out into the washing liquor containing the laundry. Otherwise, the laundry would be stained again with color that was already bonded to the color catcher laundry sheet. According to prior art, this is achieved by the covalent bonding of color catching substances to the base sheet as described above.

However, the covalent bonding of such cationic compounds is also known to weaken the base sheet leading to potential strength and break up issues in the final laundry application. Moreover, a disadvantage of the GMAC approach is that the GMAC only bonds to cellulosic components of the base sheet, which means that only a certain part of the base sheet can be functionalized. For example, the binder does hitherto not contribute to the color catching effect.

OBJECTS OF THE INVENTION

The present invention aims at overcoming the above described problems and drawbacks. In particular, it may be an object of the present invention to provide a dye-capturing non-woven fabric having an increased degree of functionalization of the base sheet and an increased capability to pick-up dye, a dye-capturing non-woven fabric involving a reduced health and safety risk upon manufacture and/or an accelerated and cost-efficient manufacture of a dye-capturing non-woven fabric (for instance by rendering a secondary chemistry treatment step dispensable).

SUMMARY OF THE INVENTION

The present inventors have made diligent studies and have found that by applying a composition to a non-woven substrate as a base sheet, wherein the composition possesses both binding and dye-capturing functionalities, the base sheet may be provided substantially completely (i.e. not only on a surface thereof) with dye-capturing functionalities. Without wishing to be bound by any theory, the present inventors assume that, upon causing a polymerization reaction of a binder (or a wet-strength agent), which may be triggered for instance by an acid (i.e. in an acidic environment, rather than in a hazardous alkaline environment), at least a part of the dye-capturing functionalities or a dye-capturing agent blended into a binding composition may be enclosed or embedded in a forming polymer (matrix) and thus bonded or attached, in particular non-covalently bonded or attached, to fibers of the non-woven substrate (in particular substantially completely and/or homogenously throughout the substrate). In particular, the dye-capturing functionalities or dye-capturing agent may hereby be absorbed in the base sheet, rather than covalently bonded as known from conventional chemical cationising, such as with GMAC. As a result, an increased dye pick-up (DPU) may be achieved, for instance by more than 20%. Moreover, since the dye-capturing functionalities or dye-capturing agent may be non-covalently bonded to the fibers any issues in terms of strength and break up due to covalent bonding may be avoided and the resulting non-woven fabric may maintain sufficient strength properties, in particular wet tensile strength, or may even exhibit improved strength properties. In addition, the composition may be applied as a single inline treatment during the manufacture or formation of the non-woven substrate, thereby reducing the cost and increasing the speed of manufacture. In particular, a subsequent secondary chemistry treatment step (such as a cationising step by means of GMAC for instance) may be dispensable, but if applied, may further boost dye pick-up performance. Still further, as previously mentioned, alkaline conditions in cationisation may be avoided as well the presence and release of potential carcinogens, thereby reducing health and safety concerns upon manufacture and upon utilization of the dye-capturing non-woven (or color catcher laundry sheet) during washing.

Accordingly, the present invention relates to a method for producing a dye-capturing (or color capture) non-woven fabric (or laundry sheet), comprising the steps of providing a non-woven substrate (or base sheet), and applying a composition to the non-woven substrate, the composition having binding (in particular polymerizing) and dye-capturing functionalities (such that at least a part of the dye-capturing functionalities (such as a dye-capturing agent) adheres to the non-woven substrate (in particularly non-releasably and/or non-covalently adheres) upon binding (in particular polymerizing) and/or such that at least a part of the dye-capturing functionalities (such as a dye-capturing agent) is absorbed in the non-woven substrate upon binding (in particular polymerizing)).

The present invention further relates to a dye-capturing (or color capture) non-woven fabric (or laundry sheet) obtainable by a method for producing a dye-capturing non-woven fabric as described herein.

In addition, the present invention relates to a dye-capturing (or color capture) non-woven fabric (or laundry sheet) comprising a non-woven substrate (or base sheet), and a dye-capturing agent adhering (in particular non-releasably and/or non-covalently adhering or binding) to the non-woven substrate by means of a binder (or wet-strength agent) and/or a dye-capturing agent being absorbed in the non-woven substrate.

Other objects and many of the attendant advantages of embodiments of the present invention will be readily appreciated and become better understood by reference to the following detailed description of embodiments of the invention.

BRIEF DESCRIPTION OF THE DRAWINGS

FIG. 1 is a schematic illustration of a reaction scheme for charge stabilization of an imidazole group of a copolymer.

FIG. 2 is a schematic illustration showing exemplary co-polymer building blocks used with imidazole.

FIG. 3*a* is a schematic illustration of a polyamido-amine epichlorohydrin polymer structure.

FIG. 3*b* is another schematic illustration of a polyamido-amine epichlorohydrin polymer structure.

FIG. 4 is a schematic illustration of a reaction scheme for (Imidazole-Epichlorohydrin)-adduct activation with citric acid.

FIG. 5 is a schematic illustration of a reaction scheme for polyamido-amine epichlorohydrin activation with citric acid.

FIG. 6 is a schematic illustration depicting a proposed cured binder structure around a nonwoven fiber structure (right), showing activated-polymer segments: (Imidazole-Epichlorohydrin)-adduct as [R1](top left) and polyamido-amine epichlorohydrin as [R2](bottom left).

DETAILED DESCRIPTION OF THE INVENTION

Hereinafter, details of the present invention and other features and advantages thereof will be described. However, the present invention is not limited to the following specific descriptions, but they are rather for illustrative purposes only.

It should be noted that features described in connection with one exemplary embodiment or exemplary aspect may be combined with any other exemplary embodiment or exemplary aspect, in particular features described with any exemplary embodiment of a dye-capturing non-woven fabric may be combined with any other exemplary embodiment of a dye-capturing non-woven fabric and with any exemplary embodiment of a method for producing a dye-capturing non-woven fabric and vice versa, unless specifically stated otherwise.

Where an indefinite or definite article is used when referring to a singular term, such as "a", "an" or "the", a plural of that term is also included and vice versa, unless specifically stated otherwise, whereas the word "one" or the number "1", as used herein, typically means "just one" or "exactly one".

The expression "comprising", as used herein, includes not only the meaning of "comprising", "including" or "containing", but may also encompass "consisting essentially of" and "consisting of".

Unless specifically stated otherwise, the expression "at least a part of", as used herein, may mean at least 5% thereof, in particular at least 10% thereof, in particular at least 15% thereof, in particular at least 20% thereof, in particular at least 25% thereof, in particular at least 30% thereof, in particular at least 35% thereof, in particular at least 40% thereof, in particular at least 45% thereof, in particular at least 50% thereof, in particular at least 55% thereof, in particular at least 60% thereof, in particular at least 65% thereof, in particular at least 70% thereof, in particular at least 75% thereof, in particular at least 80% thereof, in particular at least 85% thereof, in particular at least 90% thereof, in particular at least 95% thereof, in particular at least 98% thereof, and may also mean 100% thereof.

The term "non-woven fabric", as used herein, may in particular mean a web of individual fibers which are at least partially intertwined, but not in a regular manner as in a knitted or woven fabric. In the context of the present application, the non-woven fabric may also be denoted as a "laundry sheet", illustrating its intended purpose of use of being placed together with laundry into a washing machine during a washing process, for example in a household or in a washhouse.

The term "dye-capturing" (which may also be referred to as "color capture", "color catch", "dye-scavenging", or the like), as used herein, may in particular denote the capability of binding, adsorbing, absorbing or otherwise capturing a dye or color from a fluid, such as a washing liquor, and retaining the same such that it may not be easily released again into the fluid from which it has been removed.

The term "dye-capturing functionality", as used herein, may in particular denote a property or a functional group (for example of a molecule or a compound, for instance of a dye-capturing agent) capable of (or configured for) binding, adsorbing, absorbing or otherwise capturing a dye or color from a fluid, such as a washing liquor, and retaining the same such that it may not be easily released again into the fluid from which it has been removed. To this end, a dye-capturing functionality may in particular have cationic properties (such as being temporarily (depending on the pH environment) or permanently positively charged) or represents a cationic functional group (such as a tertiary or a quaternary amine functional group or moiety), because most of the dyes or colors which may be released from or bled out of a piece of laundry into a washing liquor are typically anionic compounds (i.e. being temporarily or permanently negatively charged).

The term "binding functionality", as used herein, may in particular denote a property or a functional group (for example of a molecule or a compound, for instance of a binder or a wet-strength agent) capable of (or configured for)

binding or adhering. To this end, in the context of the present application, a binding functionality may in particular represent a polymerizing functionality. The term “polymerizing functionality”, as used herein, may in particular denote a property or a functional group (for example of a molecule or a compound) capable of (or configured for) undergoing a polymerization reaction. Hereby, a polymer, for instance a polymer matrix, may be formed capable of (or configured for) enclosing or embedding at least a part of the dye-capturing functionalities or a dye-capturing agent blended into a binding composition, which may thus be bonded or adhered, in particular non-releasably and/or non-covalently bonded or adhered, to (fibers of) the non-woven substrate or absorbed in the non-woven substrate (or base sheet).

In a first aspect, the present invention relates to a method for producing a dye-capturing non-woven fabric, the method comprising the steps of:

providing a non-woven substrate;

applying a composition to the non-woven substrate, the composition having binding and dye-capturing functionalities.

Initially, the method comprises a step of providing a non-woven substrate (which may also be referred to as a “base sheet”).

In an embodiment, the non-woven substrate comprises one or more types of fibers basically constituting the non-woven substrate. Suitable examples of fibers include natural and/or synthetic fibers.

In particular, cellulose fibers (such as cellulose pulp) or cellulosic fibers may be used. The term “cellulosic fibers”, as used herein, may in particular denote fibers based on cellulose, in particular modified or regenerated cellulose fibers, such as fibers prepared from cellulose, or cellulose derivates, such as ethyl cellulose, cellulose acetate and the like. The term “regenerated cellulose fibers”, as used herein, may in particular denote manmade cellulose fibers obtained by a solvent spinning process. Particularly suitable examples include fibers of cellulose, viscose, lyocell, cotton, hemp, manila, jute, sisal, rayon, abaca and others, and also include fibers of soft wood pulp and hard wood pulp. Viscose (rayon) is a type of solvent spun fiber produced according to the viscose process typically involving an intermediate dissolution of cellulose as cellulose xanthate and subsequent spinning to fibers. Lyocell (tencel) is a type of solvent spun fiber produced according to the aminoxide process typically involving the dissolution of cellulose in N-methylmorpholine N-oxide and subsequent spinning to fibers.

Further suitable fibers include synthetic fibers or heat-sealable fibers. Examples thereof include fibers of polyethylene (PE), polypropylene (PP), polyester, such as polyethylene terephthalate (PET) and poly(lactic acid) (PLA). Further examples include bicomponent fibers, such as bicomponent fibers of the sheath-core type. Bicomponent fibers are composed of two sorts of polymers having different physical and/or chemical characteristics, in particular different melting characteristics. A bicomponent fiber of the sheath-core type typically has a core of a higher melting point component and a sheath of a lower melting point component. Examples of bicomponent fibers include PET/PET fibers, PE/PP fibers, PET/PE fibers and PLA/PLA fibers.

In an embodiment, the non-woven substrate comprises cellulose or cellulosic fibers.

The grammage of the non-woven substrate and/or of the non-woven web is not particularly limited. Typically, the non-woven substrate and/or of the non-woven web has a grammage of from 15 to 1000 g/m$^2$, preferably from 50 to 600 g/m$^2$ or from 20 to 120 g/m$^2$.

The length and the coarseness of the fibers are not particularly limited. The coarseness of a fiber is defined as the weight per unit length of the fiber.

Typically, the fibers may have a length of 1 to 100 mm, such as from 3 to 80 mm. Typically, the natural fibers or cellulosic fibers have a coarseness of from 30 to 300 mg/km, such as from 70 to 150 mg/km. Typically, the synthetic fibers or heat-sealable fibers have a coarseness of from 0.1 to 5 dtex, such as from 0.3 to 3 dtex.

In an embodiment, the fibers may have an average fiber length of from 1 to 15 mm, such as from 3 to 10 mm. This may be advantageous, in particular when the non-woven substrate is prepared by a wet-laid process.

In an embodiment, the fibers may have an average fiber length of from 3 mm to 100 mm, in particular of from 10 mm to 80 mm. This may be advantageous, in particular when the non-woven substrate is prepared by an air-laid process.

In an embodiment, the non-woven substrate may be prepared in advance, such as stored for a certain period of time, before a composition is applied to the nonwoven substrate, as further explained herein. It may also be possible to provide the non-woven substrate by purchasing a commercially available non-woven substrate.

It may however be advantageous, if the step of providing the non-woven substrate and the step of applying a composition to the nonwoven substrate are carried out directly one after the other or are even combined, in particular by using the same equipment, such as the same paper-making machine.

In an embodiment, the step of providing a non-woven substrate comprises forming a non-woven substrate by at least one process selected from the group consisting of a wet-laid, an air-laid, a spunlace and a spunbond process. For instance, the non-woven substrate may be formed by a conventional wet-laid process using a wet-laid machine, such as an inclined wire or flat wire machine, or a dry-forming air-laid non-woven manufacturing process. A conventional wet-lay process is described for instance in US 2004/0129632 A1, the disclosure of which is incorporated herein by reference. A suitable dry-forming air-laid non-woven manufacturing process is described for instance in U.S. Pat. No. 3,905,864, the disclosure of which is incorporated herein by reference. Thus, the non-woven substrate may be formed by a wet-laid process or an air-laid process. In addition, a spunlace process may be carried out. Spunlacing (which may also be referred to as hydroentanglement) is a bonding process for wet or dry fibrous webs where fine, high pressure jets of water penetrate the fibrous web and cause an entanglement of fibers, thereby providing fabric integrity. In an exemplary spunbond process, (substantially endless) fibers or filaments (typically made from polymers, such as thermoplastic or thermoelastic polymers) are spun from a molten mass or solution and then directly dispersed into a web by deflectors or can also be directed with air streams and stretched. In an embodiment, a spundbond process may also include a meltblown process typically involving an extrusion of melted polymer fibers through a spin net or die to form long thin fibers which are stretched and cooled by passing hot air over the fibers as they fall from the die.

In an embodiment, the composition is applied during (in-line) the process of forming (i.e. during the manufacturing of) the non-woven substrate. This may be accomplished for instance by means of a foulard or a size press being typically a part of a paper-making machine or by spraying.

Thus, the composition may be applied in-line the manufacturing of the non-woven substrate, e.g. as a single inline treatment during the manufacture or formation of the non-woven substrate, without the necessity of a subsequent (second) process as it is typically required in conventional color capture functionalization, such as by means of GMAC. As a consequence, the manufacturing costs may be reduced and the speed of manufacture may be increased.

In an embodiment, the composition to be applied to the non-woven substrate is a liquid composition, such as a solution or a dispersion, for instance comprising water and/or another solvent. This may be advantageous for efficiently and uniformly applying the composition to the non-woven substrate, for instance by means of a size press or a foulard. Additionally or alternatively, the composition may also be applied by casting, dispensing, spreading, spray coating, dip coating, curtain coating, roll coating, printing (such as inkjet printing), or the like.

The composition to be applied to the non-woven substrate has both binding and dye-capturing functionalities. In particular, the composition may comprise one or more compounds having binding functionalities and one or more (other) compounds having dye-capturing functionalities. It may however also be possible that the composition comprises one or more compounds having both binding and dye-capturing functionalities, for example a binder having dye-capturing functionalities or a dye-capturing agent having binding functionalities.

By applying a composition having both binding and dye-capturing functionalities to the non-woven substrate, it may be possible to adhere or attach dye-capturing functionalities (such as a dye-capturing agent) to the non-woven substrate, in particular to fibers thereof, upon binding. In particular, it may be possible to non-releasably adhere or attach dye-capturing functionalities (such as a dye-capturing agent) to the non-woven substrate, in particular to fibers thereof, i.e. such that the dye-capturing agent may not be released from the non-woven substrate upon contact with water, e.g. that the dye-capturing agent may substantially not be leached or washed out. Additionally or alternatively, it may be possible to non-covalently adhere or attach dye-capturing functionalities (such as a dye-capturing agent) to the non-woven substrate, in particular to fibers thereof. In particular, it may be possible to absorb the dye-capturing functionalities or dye-capturing agent in the non-woven substrate. For instance, upon causing a polymerization reaction of the binder or wet-strength agent, at least a part of the dye-capturing functionalities or a dye-capturing agent blended into the composition may be enclosed or embedded in a forming polymer (matrix) and thus bonded or attached, in particular non-covalently bonded or attached, to fibers of the non-woven substrate (in particular substantially completely and/or homogenously throughout the substrate). Descriptively spoken, it may be possible that dye-capturing functionalities (such as a dye-capturing agent) may be attached to fibers of the non-woven substrate by a polymer binder acting as a glue or adhesive, but without forming covalent (or chemical) bonds to the fibers. Hereby, a firm attachment of dye-capturing functionalities may be achieved, thereby substantially avoiding a release or bleeding-out of dye (once catched by the dye-capturing functionalities), without however impairing the strength of the non-woven substrate, as it is often the case in conventional color capture functionalization, such as by cationization with for instance GMAC. Rather, it may even be possible that the strength, such as the wet tensile strength, of the non-woven substrate may be increased by applying a composition having binding functionalities. Moreover, since it may be possible to provide the non-woven substrate substantially completely (i.e. not only on a surface thereof) with dye-capturing functionalities, the dye pick-up capacity may be significantly increased.

In an embodiment, the composition comprises a cationic polymer. A cationic polymer may provide binding and/or dye-capturing functionalities. Thus, by taking this measure, a composition having both binding and dye-capturing functionalities may be achieved by a single compound. Nevertheless, a combination of two or more cationic polymers each having both binding and dye-capturing functionalities may be employed as well.

In an embodiment, the cationic polymer comprises an amine moiety, in particular at least one of a primary, secondary, tertiary and quaternary amine moiety, more specifically at least one of a secondary, tertiary and quaternary amine moiety, still further specifically at least one of a tertiary and quaternary amine moiety.

In an embodiment, the cationic polymer comprises quaternary amine moieties. By taking this measure, the polymer may provide dye-capturing functionalities irrespective of the pH environment, for instance also at a neutral or even alkaline pH, as it may be the case in a washing liquor.

In an embodiment, the cationic polymer has cationic moieties in its polymer backbone chain. For instance, the cationic polymer may be a linear polymer having a polymer backbone chain with cationic moieties. The cationic moieties may in particular be selected from a tertiary or a quaternary amine moiety. A suitable example thereof may include polyamido-amine epichlorohydrin (PAAE), which has proven particularly suitable for solving the objects of the present invention.

In an embodiment, the cationic polymer has side chains comprising cationic moieties. For instance, the cationic polymer may be a (branched) polymer grafted with side chains comprising cationic moieties. The cationic moieties may in particular be selected from a tertiary or a quaternary amine moiety. A suitable example thereof may include a copolymer of vinylimidazole and vinylpyrrolidone, which has proven particularly suitable for solving the objects of the present invention.

In an embodiment, the composition comprises a cationic polymer in an amount of from 0.1 to 30 wt.-%, such as in an amount of 0.2 to 20 wt.-%, such as in an amount of from 0.5 to 15 wt.-%, such as in an amount of from 0.75 to 12.5 wt.-%, such as in an amount of from 1 to 10 wt.-%, based on the total weight of the composition.

In an embodiment, the composition comprises a binder (or wet-strength agent) and a dye-capturing agent. The term "binder", as used herein, may in particular denote a compound that has or exhibits binding functionality. The term "wet-strength agent", as used herein, may in particular denote an agent that improves the tensile strength of the non-woven web in the wet state and may have or exhibit binding functionality. The term "dye-capturing agent", as used herein, may in particular denote a compound that has or exhibits dye-capturing functionality.

In an embodiment, the binder or wet-strength agent comprises polyamido-amine epichlorohydrin (PAAE), which has proven particularly suitable for solving the objects of the present invention.

In an embodiment, the dye-capturing agent is selected from the group consisting of a copolymer of vinylimidazole (more specifically N-vinylimidazole) and vinylpyrrolidone (more specifically N-vinylpyrrolidone), a copolymer of vinylimidazole (more specifically N-vinylimidazole) and vinylcarbazole (more specifically N-vinylcarbazole), a copolymer of vinylimidazole (more specifically N-vinylimidazole) and vinylphthalimide (more specifically N-vinylphthalimide), and a copolymer of vinylimidazole (more specifically N-vinylimidazole) and vinylindole (more specifically N-vinylindole). In particular, the dye-capturing agent may comprise a copolymer of vinylimidazole and vinylpyrrolidone, which has proven particularly suitable for solving the objects of the present invention.

In an embodiment, the composition comprises a binder or wet-strength agent in an amount of from 0.1 to 30 wt.-%, such as in an amount of 0.2 to 25 wt.-%, such as in an amount of from 0.5 to 20 wt.-%, such as in an amount of from 0.75 to 17.5 wt.-%, such as in an amount of from 1 to 15 wt.-%, based on the total weight of the composition.

In an embodiment, the composition comprises a dye-capturing agent in an amount of from 0.1 to 20 wt.-%, such as in an amount of 0.2 to 17.5 wt.-%, such as in an amount of from 0.5 to 15 wt.-%, such as in an amount of from 0.75 to 12.5 wt.-%, such as in an amount of from 1 to 10 wt.-%, based on the total weight of the composition.

In an embodiment, the composition further comprises an acid and/or a salt thereof (i.e. an acid salt), in particular an organic acid and/or a salt thereof (i.e. an organic acid salt). By taking this measure, the pH value of the composition may be appropriately adjusted such that a polymerization reaction of binding functionalities or of a binder or wet-strength agent may be triggered or caused after the composition has been applied to the non-woven substrate and for instance subjected to heat and/or pressure. As a result thereof, at least a part of the dye-capturing functionalities or a dye-capturing agent blended into the composition may be enclosed or embedded in a forming polymer (matrix) and thus bonded or attached, in particular non-covalently bonded or attached, to fibers of the non-woven substrate.

Suitable examples of an acid include carboxylic acids, in particular selected from the group consisting of monocarboxylic acids, dicarboxylic acids, tricarboxylic acids, and polycarboxylic acids, in particular selected from the group consisting of aliphatic monocarboxylic acids, aliphatic dicarboxylic acids, aliphatic tricarboxylic acids, and aliphatic polycarboxylic acids, preferably selected from the group consisting of dicarboxylic acids, tricarboxylic acids, and polycarboxylic acids, in particular selected from the group consisting of aliphatic dicarboxylic acids, aliphatic tricarboxylic acids, and aliphatic polycarboxylic acids. For instance, the acid may be selected from the group consisting of acetic acid, maleic acid, fumaric acid, oxalic acid, malonic acid, succinic acid, adipic acid, citric acid, and butane tetracarboxylic acid. In particular, the acid may comprise citric acid, which has proven particularly suitable for solving the objects of the present invention. Suitable salts of the aforementioned acids include alkali salts thereof, in particular sodium and/or potassium salts thereof, such as sodium citrate.

In an embodiment, the composition comprises an acid and/or a salt thereof in an amount of from 0.1 to 5 wt.-%, such as in an amount of 0.2 to 2.5 wt.-%, such as in an amount of from 0.3 to 2 wt.-%, such as in an amount of from 0.4 to 1.5 wt.-%, such as in an amount of from 0.5 to 1 wt.-%, based on the total weight of the composition.

In an embodiment, the composition may have a pH value, for instance adjusted by addition of an acid and/or a salt thereof to the composition, in a range of from pH 2 to pH 7, in particular from pH 2.5 to pH 6, such as from pH 3 to pH 5, in particular from pH 3 to pH 4. By taking this measure, a polymerization reaction of binding functionalities or of a binder or wet-strength agent may be triggered or caused after the composition has been applied to the non-woven substrate and for instance subjected to heat and/or pressure. As a result thereof, at least a part of the dye-capturing functionalities or a dye-capturing agent blended into the composition may be enclosed or embedded in a forming polymer (matrix) and thus bonded or attached, in particular non-covalently bonded or attached, to fibers of the non-woven substrate. Moreover, alkaline conditions in cationisation may be avoided, thereby reducing health and safety concerns upon manufacture and upon utilization of the dye-capturing non-woven (or color catcher laundry sheet) during washing.

In a preferred embodiment, the composition comprises polyamido-amine epichlorohydrin (PAAE), a copolymer of vinylimidazole and vinylpyrrolidone and citric acid (and/or a salt thereof, such as sodium citrate), which combination has proven particularly suitable for solving the objects of the present invention.

In an embodiment, the method may further comprise a drying step, in particular after the step of applying the composition having binding and dye-capturing functionalities to the non-woven substrate, such as immediately after the step of applying the composition to the non-woven substrate. For instance, the drying step may preferably be carried out such that water or any other solvent stemming from the composition or from the formation of the non-woven substrate (for instance in case of a wet-laid process and/or a spunlace process) is substantially removed. In addition or alternatively, the drying step may preferably be carried out such that binding functionalities of the composition are caused to undergo a polymerization reaction, thereby attaching or binding at least a part of the dye-capturing functionalities or a dye-capturing agent to (fibers of) the non-woven substrate. To this end, the drying temperature may be set at a temperature of more than 80° C., such as more than 100° C., such as more than 120° C., such as more than 140° C., such as more than 180° C.

In an embodiment, the method may further comprise a step of treating the dye-capturing non-woven fabric with a (further or secondary, for instance conventional) cationising agent, in particular after the step of applying the composition having binding and dye-capturing functionalities and/or in particular after the (optional) drying step, as discussed in the foregoing. By such subsequent or secondary chemistry treatment step, the dye pick-up performance may be further increased. In particular, the (secondary) cationising agent may comprise glycidetrimethylammonium chloride (GMAC), which has proven particularly suitable for further boosting the dye pick-up performance of a dye-capturing non-woven fabric according to the present invention.

In a second aspect, the present invention relates to a dye-capturing non-woven fabric obtainable by a method for producing a dye-capturing non-woven fabric as described herein.

In a third aspect, the present invention relates to a dye-capturing non-woven fabric comprising a non-woven substrate (or base sheet), and a dye-capturing agent adhering (in particular non-releasably and/or non-covalently adhering or binding) to the non-woven substrate by means of a binder or wet-strength agent. In particular, the dye-capturing agent may be absorbed in the non-woven substrate, rather than covalently bonded. The dye-capturing non-woven fabric according to the third aspect may for instance be prepared by a method for producing a dye-capturing non-woven fabric as described herein.

Moreover, the dye-capturing non-woven fabric according to the second and/or the third aspect may comprise a non-woven substrate, a dye-capturing agent and/or a binder (or wet-strength agent), as exemplified above in connection with the method for producing a dye-capturing non-woven fabric. In particular, the dye-capturing non-woven fabric may comprise dye-capturing functionalities or a dye-capturing agent enclosed or embedded in a polymer (matrix) and thus bonded or attached, in particular non-covalently bonded or attached, to fibers of the non-woven substrate. In particular, dye-capturing functionalities or a dye-capturing agent may be absorbed in the non-woven substrate, rather than covalently bonded.

In a preferred embodiment, the dye-capturing agent comprises a copolymer of vinylimidazole and vinylpyrrolidone, and the binder or wet-strength agent comprises polyamido-amine epichlorohydrin (PAAE), which combination has proven particularly suitable for solving the objects of the present invention, as further illustrated in the following.

The present invention is further described by the following typical reaction steps and examples, which are solely for the purpose of illustrating specific embodiments, and are not construed as limiting the scope of the invention in any way.

Typical reaction steps of polyamido-amine epichlorohydrin (PAAE), a copolymer of vinylimidazole and vinylpyrrolidone and citric acid:

Step 1:

Charge stabilization on the imidazole group using epichlorohydrin (epoxy resin) (see FIG. 1).

The amount of the potentially reactive imidazole groups can be adjusted by varying the [n/m]-ratio in the co-polymer. In the process example the vinylpyrrolidone (NVP) co-polymer is used. Other potentially used co-polymer groups are shown in FIG. 2.

PAAE requires no charge stabilization, as the cationic charge is stabile on its PAAE group as shown in FIG. 3/*a* and 3/*b*. Thus, PAAE is the choice of wet strength resin due to the available epoxy-groups and the functional cationic quaternary-amine groups on the polymer backbone.

Step 2.

Activating the stabilized charged molecules for polymerization. This means an activation with citric acid of the (Imidazole-Epichlorohydrin)-adduct (IE-adduct) which is shown in FIG. 4, and the Polyamido-amine epichlorohydrin (PAAE) shown in FIG. 5.

Step 3.

Immobilization of the activated charged polymer fragments by acidic and thermal curing of the binder mixture. As the carboxylic activation of the Polyamido-amine epichlorohydrin leads to a loss of cationic functionalization, it is important to find the balance of the polymerization requirement (binder strength) and the loss of charge from the PAAE backbone. In the shown process example, 6 Kg citric acid loading was performed in 1000 L binder solution, reaching a pH of 3.9.

The citric acid basically acts as connecting bridges between the IE-adduct and PAAE. Both groups have stabilized cationic charges, IE-adduct on the branched polymer moiety, the PAAE on the polymer backbone. FIG. 6 shows the depicted proposed structure of the cured binding mixture, showing activated-polymer segments: IE-adduct as [R1] and PAAE as [R2].

EXAMPLES

Comparative Example 1 (C. Ex. 1)

A standard non-woven substrate (66% International ECF Pulp, 34% viscose fibers (Danufil) 5 mm or 8 mm×0.95 dtex) was treated with glycidetrimethylammonium chloride (GMAC) in a conventional secondary chemistry treatment to obtain a GMAC-functionalised control sample.

Example 1 (Ex. 1)

A similar standard non-woven substrate as used for Comparative Example 1 was inline functionalized to obtain a dye-capturing non-woven fabric according to an exemplary embodiment of the present invention, by applying a composition comprising:

- 80 L Sokalan HP66K (copolymer of vinylimidazole and vinylpyrrolidone)
- 130 L Kymene GHP20 (polyamido-amine epichlorohydrin)
- 6 kg citric acid
- +786 L water to get 1000 L composition having a final pH of 3.9.

Example 2 (Ex. 2)

The dye-capturing non-woven fabric of Example 1 was additionally treated with glycidetrimethylammonium chloride (GMAC) in a conventional secondary chemistry treatment to obtain a dye-capturing non-woven fabric according to another exemplary embodiment of the present invention.

Various material properties of the non-woven fabrics according to Comparative Example 1 and Examples 1 and 2 were determined, the results of which are summarized in Table 1 below:

The dry and wet tensile strengths were determined similar to the test methods described in ISO 1924-2, wherein "tensile MD" represents the respective tensile strength in machine direction and "tensile CD" represents the respective tensile strength in cross machine direction.

Moreover, the Dye Pick Up (DPU) performance of the non-woven fabrics was measured. The DPU test has been developed in house to measure mg of dye absorbence using a Spectrometer (Hach Lange DR 6000, measurements were recorded at the wavelength of 538 nm). Key quoted value is "Absorbence mg of dye after 3 minutes".

TABLE 1

| | unit | C.Ex.1 | Ex.1 | Ex.2 |
|---|---|---|---|---|
| Basis Weight | gsm | 62.94 | 59.89 | 63.06 |
| Content GMAC | g | 2.69 | 0.00 | 2.71 |
| Dry Tensile MD | N/15 mm | 46.9 | 50.3 | 47.6 |
| Dry Tensile CD | N/15 mm | 28.1 | 32.4 | 28.4 |
| Wet Tensile MD 1 min H20 | N/15 mm | 11.8 | 13.4 | 12.2 |
| Wet Tensile CD 1 Min H20 | N/15 mm | 8 | 9.2 | 8.1 |
| Extinction 1 min | | 1.244 | 1.116 | 1.077 |
| Extinction 2 min | | 1.160 | 1.021 | 0.854 |
| Extinction 3 min | | 1.096 | 0.948 | 0.707 |
| Absorbance mg of dye after 1 min | | 11.623 | 15.247 | 20.265 |
| Absorbance mg of dye after 2 min | | 15.970 | 19.512 | 31.806 |
| Absorbance mg of dye after 3 min | | 19.282 | 26.941 | 39.413 |
| | | | +28.4% DPU | +51% DPU |

As can be taken from the results as shown in Table 1, an excellent dye capture performance both with and without the use of a secondary GMAC treatment was recorded. By applying a composition having binding and dye-capturing functionalities during the manufacture of a non-woven substrate (Example 1), an increase in DPU performance by more than 25% compared with a conventional secondary treatment with GMAC (Comparative Example 1) can be achieved and furthermore the tensile strength, both dry and wet as well as both MD and CD, may be increased. By an additional secondary treatment with GMAC (Example 2), DPU performance may be further improved, for instance by more than 50% compared with only a conventional secondary treatment with GMAC (Comparative Example 1).

While the present invention has been described in detail by way of specific embodiments and examples, the invention is not limited thereto and various alterations and modifications are possible, without departing from the scope of the invention.

The invention claimed is:

1. A method for producing a dye-capturing non-woven fabric, the method comprising the steps of:
- providing a non-woven substrate;
- applying a composition to the non-woven substrate, the composition having binding and dye-capturing functionalities and comprising:
  - a binder, wherein the binder comprises polyamido-amine epichlorohydrin (PAAE);
  - a dye-capturing agent having a cationic functional group; and
  - at least one of an acid or a salt thereof;
- stabilizing a charge of the cationic functional group using the binder to obtain a stabilized cationic charge;
- activating the stabilized cationic charge with the at least one of an acid or a salt thereof to obtain an activated charged adduct of the binder, the dye-capturing agent and the at least one of an acid or a salt thereof; and
- immobilizing the activated charged adduct at the non-woven substrate.

2. The method according to claim 1, wherein the step of providing a non-woven substrate comprises forming a non-woven substrate by at least one process selected from the group consisting of a wet-laid, an air-laid, a spunlace and a spunbond process.

3. The method according to claim 1, wherein the composition is applied during manufacture of the non-woven substrate.

4. The method according to claim 1, wherein the dye-capturing agent is selected from the group consisting of copolymers of vinylimidazole and vinylpyrrolidone, copolymers of vinylimidazole and vinylcarbazole, copolymers of vinylimidazole and vinylphthalimide, and copolymers of vinylimidazole and vinylindole.

5. The method according to claim 1, wherein the acid is an organic acid.

6. The method according to claim 1, wherein the composition comprises polyamido-amine epichlorohydrin (PAAE), a copolymer of vinylimidazole and vinylpyrrolidone and citric acid.

7. The method according to claim 1, further comprising a step of treating the dye-capturing non-woven fabric with a cationising agent.

8. The method according to claim 1, wherein the composition has a pH value adjusted by addition of the at least one of an acid or a salt thereof in a range of 2 to 7.

9. The method according to claim 1, wherein the composition has a pH value adjusted by addition of the at least one of an acid or a salt thereof in a range of 2 to 6.

* * * * *